(12) United States Patent
Nalle, Jr. et al.

(10) Patent No.: US 12,492,222 B2
(45) Date of Patent: Dec. 9, 2025

(54) LIPOPHILIC ENANTIOMERS OF DESACETYLGLUCOSAMINE MURAMYL DIPEPTIDE WITH ANTI-INFLAMMATORY AND GROWTH PROMOTING ACTIVITY

(71) Applicant: Nutrivert Inc., Atlanta, GA (US)

(72) Inventors: Horace Disston Nalle, Jr., Atlanta, GA (US); Bernhard Kaltenboeck, Auburn, AL (US)

(73) Assignee: Nutrivert Inc., Atlanta, GA (US)

( * ) Notice: Subject to any disclaimer, the term of this patent is extended or adjusted under 35 U.S.C. 154(b) by 632 days.

(21) Appl. No.: 17/912,647

(22) PCT Filed: Mar. 25, 2021

(86) PCT No.: PCT/US2021/024142
§ 371 (c)(1),
(2) Date: Sep. 19, 2022

(87) PCT Pub. No.: WO2021/195372
PCT Pub. Date: Sep. 30, 2021

(65) Prior Publication Data
US 2023/0174577 A1    Jun. 8, 2023

Related U.S. Application Data

(60) Provisional application No. 63/000,364, filed on Mar. 26, 2020.

(51) Int. Cl.
| C07K 5/062 | (2006.01) |
| A23K 20/147 | (2016.01) |
| A61K 38/00 | (2006.01) |

(52) U.S. Cl.
CPC ........ *C07K 5/06026* (2013.01); *A23K 20/147* (2016.05); *A61K 38/00* (2013.01); *C07B 2200/07* (2013.01)

(58) Field of Classification Search
CPC ............ A61K 2039/5555; A61K 38/00; A61K 39/39; A61P 1/00; C07K 5/06026; C07K 5/0806
See application file for complete search history.

(56) References Cited

U.S. PATENT DOCUMENTS

| 4,693,998 | A | * | 9/1987 | Lefrancier | .............. A61P 33/00 536/55.2 |
| 5,268,357 | A | | 12/1993 | Yabiki et al. | |
| 5,514,654 | A | | 5/1996 | Pecar et al. | |
| 5,976,580 | A | | 11/1999 | Ivey et al. | |
| 8,580,772 | B2 | | 11/2013 | Wray et al. | |
| 8,603,978 | B2 | | 12/2013 | Strober et al. | |
| 9,884,084 | B2 | | 2/2018 | Han et al. | |
| 2009/0181906 | A1 | | 7/2009 | Wray et al. | |
| 2010/0183714 | A1 | | 7/2010 | Bogataj et al. | |
| 2010/0292153 | A1 | | 11/2010 | Strober | |
| 2013/0195798 | A1 | | 8/2013 | Jeffs et al. | |
| 2014/0065186 | A1 | | 3/2014 | Tokura et al. | |
| 2014/0205711 | A1 | | 7/2014 | Kobler et al. | |
| 2015/0141352 | A1 | | 5/2015 | Han et al. | |
| 2018/0303128 | A1 | | 10/2018 | Sallam et al. | |
| 2018/0371023 | A1 | | 12/2018 | Ella et al. | |
| 2019/0125873 | A1 | | 5/2019 | Lin | |
| 2023/0174577 | A1 | | 6/2023 | Nalle et al. | |

FOREIGN PATENT DOCUMENTS

| AU | 2021241625 A1 | 11/2022 |
| CA | 3172936 A1 | 9/2021 |
| CN | 101756026 A | 6/2010 |
| CN | 102578414 A | 7/2012 |
| CN | 102578414 B | 1/2014 |
| EP | 0635026 B1 | 11/1999 |
| EP | 4126040 A1 | 2/2023 |
| JP | 07505371 A | 6/1995 |
| JP | 2017528514 A | 9/2017 |
| WO | 9313791 A1 | 7/1993 |
| WO | 2009039972 A2 | 4/2009 |
| WO | 2016008946 A1 | 1/2016 |
| WO | 2017098529 A1 | 6/2017 |
| WO | 2017223337 A1 | 12/2017 |
| WO | 2020019128 A1 | 1/2020 |
| WO | 2021195372 A1 | 9/2021 |

OTHER PUBLICATIONS

Australian Application No. 2021241625, "First Examination Report", Mailed on Feb. 19, 2025, 3 pages.
Mexican Patent Application No. MX/A/2022/011751, Notice of Allowance, Mailed on Feb. 11, 2025, 3 pages.
New Zealand Patent Application No. 792610, "First Examination Report", Mailed on Feb. 26, 2025, 3 pages.
European Application No. 21774898.7, "Decision to Grant", Mailed on Jan. 23, 2025, 2 pages.
Indian Application No. 202217060292, First Examination Report, Dec. 5, 2024, 8 pages.
Japanese Application No. 2022-558084, Notice of Allowance mailed on Mar. 18, 2025, 3 pages.
"(2R)-2-Amino-3-[(2S)-2-[(2R)-5-amino-2-[[(2S)-2-[[(2R)-2-hydroxypropanoyl]amino]propanoyl]amino]-5-oxopentanoyl]oxy-3-(carboxymethylamino)-3-oxopropyl]sulfanylpropanoic acid", Pubmed Compound Record for CID 118658462, U.S. National Library of Medicine, Available Online at https://pubchem.ncbi.nlm.nih.gov/compound/118658462, Feb. 23, 2016, 9 pages.

(Continued)

*Primary Examiner* — Pancham Bakshi
(74) *Attorney, Agent, or Firm* — Kilpatrick Townsend & Stockton LLP

(57) ABSTRACT

Compositions of matter and methods to reduce inflammation in vertebrates and to promote growth and feed conversion in animals by administering an effective amount of a composition containing a mirror image molecule (enantiomer) of a lipophilic muramyl dipeptide (MDP) derivative that does not contain the N-acetylglucosamine moiety of MDP (i.e., a desmuramyl dipeptide).

18 Claims, 3 Drawing Sheets

(56) References Cited

OTHER PUBLICATIONS

Fidler, "Systemic Activation of Tumoricidal Properties in Mouse Macrophages and Inhibition of Melanoma Metastases by Then Oral Administration of MTP-PE, A Lipophilic Muramyl Dipeptide", Journal of Immunology, vol. 138, 1987, pp. 4509-4514.

Fogler et al., "Distribution and Fate of Free and liposome-Encapsulated [3H]nor-Muramyl Dipeptide and [3H]muramyl Tripeptide Phosphatidylethanolamine in Mice", Journal of Immunology, vol. 135, Aug. 1985, pp. 1372-1377.

Gobec et al., "Structural Requirements of Acylated Gly-L-Ala-D-Glu Analogs for Activation of The Innate Immune Receptor NOD2", European Journal of Medidnal Chemistry, vol. 116, 2016, pp. 1-12.

Hatfield, "Carboxylesterases: General Detoxifying Enzymes", Chemico-Biological Interactions, vol. 259, Nov. 25, 2016, pp. 327-331.

Irby et al., "Lipid-Drug Conjugate for Enhancing Drug Delivery", Molecular Pharmaceutics, vol. 14, No. 5, May 1, 2017, pp. 1325-1338.

Veyrieres et al., "Amino Sugars. LV. Absolute Configuration of the Carboxyethyl (Lactyl) Side Chain of Muramic Acid[2-amino-3-0-(D-1-carboxyethyl)-2-deoxy-d-glucose]", Biochemistry, vol. 9, 1970, pp. 4153-4159.

Matsumoto et al., "Stimulation of Nonspecific Resistance to Infection Induced by Muramyl Dipeptide Analogs Substituted in the ⌈-carboxyl Group and Evaluation of Nα-muramyl Dipeptide-nε-stearoyllysine", Infection and Immunity, vol. 39, Mar. 1983, pp. 1029-1040.

McDonald et al., "Peptidoglycan Signaling in Innate Immunity and Inflammatory Disease", The Journal of Biological Chemistry, vol. 280, No. 21, May 27, 2005, pp. 20177-20180.

Parant et al., "Immunostimulant Activities of a Lipophilic Muramyl Dipeptide Derivative and of Desmuramyl Peptidolipid Analogs", Infection and Immunity, vol. 27, No. 3, Mar. 1980, pp. 826-831.

International Application No. PCT/US2017/038790, "Methods to Promote Growth and Improve Feed Conversion in Animals", 2017, 25 pages.

International Application No. PCT/US2021/024142, International Search Report and Written Opinion mailed Aug. 5, 2021, 11 pages.

International Application No. PCT/US2021/024142, Invitation to Pay Additional Fees and, Where Applicable, Protest Fee mailed May 25, 2021, 2 pages.

Sidwell et al., "Antiviral Activity of an Immunomodulatory Lipophilic Desmuramyl Dipeptide Analog", Antiviral Research, vol. 26, No. 2, Mar. 1995, pp. 145-159.

Spector et al., "Membrane Lipid Composition and Cellular Function", Journal of Lipid Research, vol. 26, 1985, pp. 1015-1035.

Van Meer et al., "Membrane Lipids: Where They are and How They Behave", Nature Reviews Molecular Cell Biology, vol. 9, No. 2, Feb. 2008, pp. 112-124.

Watanabe et al., "Muramyl Dipeptide Activation of Nucleotide-binding Oligomerization Domain 2 Protects Mice From Experimental Colitis", The Journal of Clinical Investigation, vol. 118, No. 2, Feb. 1, 2008, pp. 545-559.

Watanabe et al., "NOD2 Downregulates Colonic Inflammation by IRF4-Mediated Inhibition of K63-linked Polyubiquitination of RICK and TRAF6", Mucosal Immunology, vol. 7, Mar. 2014, pp. 1312-1325.

Zhou et al., "Exploring the Stereochemistry of CXCR4-Peptide Recognition and Inhibiting HIV-1 Entry With D-peptides Derived From Chemokines", The Journal of Biological Chemistry, vol. 277, No. 20, 2002, pp. 17476-17485.

International Application No. PCT/US2021/024142, International Preliminary Report on Patentability, mailed Oct. 6, 2022, 8 pages.

Gust et al., "Bacteria-derived Peptidoglycans ConstitutePathogen-associated Molecular Patterns Triggering Innate Immunity in *Arabidopsis*", The Journal of Biological Chemistry, vol. 282, No. 44, Nov. 2, 2007, pp. 32338-32348.

Hamilton et al., "Streptococcal Cell Walls and Synovial Cell Activation: Simulation of Synovial Fibroblast Plasminogen Activator Activity by Monocytes Treated with Group A Streptococcal Cell Wall Sonicates and Muramyl Dipeptide", Journal of Experimental Medicine, vol. 155, No. 6, Jun. 1, 1982, pp. 1702-1718.

Zhang et al., "Effects of Dietary Supplementation of A3alpha-Peptidoglycan on the Growth, Immune Response and Defence of Sea Cucumber *Apostichopus japonicus*", Aquaculture Nutrition, vol. 20, No. 2, 2014, pp. 219-228.

Zhou et al., "Effects of Dietary Supplementation of A3α-Peptidoglycan on Innate Immune Responses and Defense Activity of Japanese Flounder (*Paralichthys olivaceus*)", Aquaculture, vol. 251, Feb. 28, 2006, pp. 172-181.

* cited by examiner

LIPOPHILIC ENANTIOMERS OF DESACETYLGLUCOSAMINE MURAMYL DIPEPTIDE WITH ANTI-INFLAMMATORY AND GROWTH PROMOTING ACTIVITY

CROSS REFERENCE TO PRIORITY APPLICATION

This application claims the benefit of U.S. Provisional Application Ser. No. 63/000,364, filed Mar. 26, 2020, titled "Lipophilic Enantiomers of Desacetylglucosamine Muramyl Dipeptide with Anti-Inflammatory and Growth Promoting Activity." the entire contents of which are hereby incorporated by reference.

FIELD

The field of the present invention relates to lipophilic muramyl dipeptide enantiomer compositions and methods for reducing inflammation, promoting growth and enhancing feed conversion in animals including humans.

BACKGROUND

Muramyl dipeptide (MDP) is the minimal structure that is preserved in all bacterial peptidoglycans (PGN). It consists of N-acetyl muramic acid (ether of N-acetylglucosamine and D-lactic acid) linked with peptide bonds to L-alanine and D-γ-glutamate or D-isoglutamine (MacDonald 2005).

PGN has long been known to promote an inflammatory response. The MDP subcomponent of PGN was found to be the minimal chemical structure required to elicit inflammation. MDP is also required for the adjuvant activity of Freund's complete adjuvant, an emulsion of a mycobacterial extract (MacDonald 2005). As an adjuvant, MDP promotes a strong immune reaction that is used to boost the effectiveness of vaccines when injected together with vaccine antigens.

While stimulating extraintestinal inflammation, MDP has anti-inflammatory effects in the intestinal tract, and protects mice from experimentally induced colitis (Watanabe 2008; Watanabe 2014).

The intestinal anti-inflammatory properties of MDP provide opportunities for therapeutic applications (Strober 2013). However, MDP is hydrophilic and rapidly removed via kidney excretion from circulation, thus requiring high-dosed and repeated administration in order to mediate non-specific resistance to infection or adjuvant activity (Fogler 1985).

These unfavorable pharmacokinetics and serious side effects prompted many chemical modifications of MDP to correct for these shortcomings. Most successful among those were lipid modifications of MDP that increased both potency and half-life of MDP (Parent 1980; Matsumoto 1983; Fogler 1985).

Covalent lipid MDP conjugates thus have demonstrated several advantages including improved oral bioavailability, enhanced tumor targeting and therapeutic potency, reduced toxicity, and enhanced drug loading into delivery carriers such as liposomes (Fidler 1987; Irby 2017).

Surprisingly, the complete muramyl dipeptide molecule is not required for biological activity with lipophilic conjugated MDP. Even the L-alanine-D-isoglutamine dipeptide MDP moiety without N-acetyl muramic acid retains immunomodulating activity of MDP, when covalently conjugated to lipophilic moieties. For instance, Gobec (2016) successfully replaces N-acetyl muramyl with acyl moieties in acyl-glycine-L-alanine-D-glutamate MDP analogs. Penney (1999) removes the muramyl moiety altogether in octadecyl L-alanine-D-isoglutamine that still retains strong immunomodulating activity.

Furthermore, both Penney (1999) and Gobec (2016) demonstrate that D-isoglutamine can be replaced in the lipophilic desmuramyl dipeptides with D-glutamine or D-glutamate without loss of function.

Enhanced growth in animals is measured either by growth in mass per unit of time or by growth in mass per unit of nutrition; the latter is sometimes referred to as feed conversion. Promotion of growth by either measure is economically useful in the production of animal protein for consumption by humans and other animals because it reduces the amount of time or feed required to obtain equal gains in body mass.

Antibiotics fed at subinhibitory doses have been used for a long time as growth promoters to enhance growth in agricultural production animals. They presumably work by releasing components from intestinal bacteria (postbiotics), including MDP, which suppress inflammation within the intestinal tract. This mechanism most likely has evolved to protect animals from damaging responses to the trillions of gut-dwelling bacteria.

Due to the widespread induction of antibiotic resistance in bacteria by use of antibiotics as growth promoters, replacement of antibiotics as growth promoters is highly desirable. Nalle and Kaltenboeck teach that low-dose oral administration of potent lipophilic MDP analogs improves growth rates and feed conversion in animals (Nalle 2017), presumably due to reduction of asymptomatic intestinal inflammation, and thus of the whole-body systemic inflammatory status.

Production of the N-acetyl muramic acid MDP intermediate by multi-step chemical synthesis is difficult, rendering lipophilic MDP analogs too expensive for use as growth promoters in livestock. This makes immunomodulating lipophilic desmuramyl dipeptides prime candidates for non-antibiotic growth promotion in animals.

Sidwell (1995) and Penney (1999) show that octadecyl D-alanine-L-glutamine, a stereochemical mirror image molecule (enantiomer) of the lipophilic octadecyl L-alanine-D-glutamine desmuramyl dipeptide, is an even stronger immunomodulator than octadecyl L-alanine-D-glutamine.

While counterintuitive, Zhou (2002) shows that enantiomeric mirror image D-peptides of natural receptor-binding L-peptides bind their cognate receptor as strongly, or even more strongly, than the natural peptides. Additionally, such D-peptide enantiomers are biologically highly active because they are much more stable than their L-counterparts, being resistant to degradation due to the absence of naturally degrading enzymes.

The binding of enantiomeric peptides to the cognate receptor, as well as the increased stability of such naturally not occurring peptides, explains the strong biological effect of octadecyl D-alanine-L-glutamine desmuramyl dipeptide (BCH-527). This dipeptide also avoids the complicated synthesis of the anisotropic cyclic carbohydrate moiety of N-acetyl muramic acid and thus is a prime cost effective MDP analog candidate for use as growth promoter in animals.

As a lipophilic desmuramyl MDP enantiomer, octadecyl D-alanine-L-glutamine desmuramyl dipeptide has two shortcomings: i) it lacks the lactic acid moiety of N-acetyl muramic acid that links the N-acetylglucosamine moiety of muramic acid to the dipeptide (Jeanloz 1970), thus may forfeit some binding strength to its cognate receptor; ii) it contains the high-melting octadecyl aliphatic lipid that is suboptimal for cell membrane insertion (cellular targeting), intra-membrane transport, and intracellular release (Spector 1985; van Meer 2008), and thus disfavors the intracellular esterase cleavage of the ester bond (Hatfield 2016) between dipeptide and lipid that intracellularly releases the active dipeptide component of octadecyl D-alanine-L-glutamine.

Accordingly, there is a need for compounds that maximize the immunomodulatory activity of lipophilic desmuramyl MDP enantiomers.

SUMMARY

Described herein is an oligopeptide analog of MDP (also referred to herein as an oligopeptide or a compound) comprising an L-lactate-D-alanine-L-glutamine moiety. In some cases, the analog does not contain the N-acetylglucosamine moiety of MDP. The oligopeptides described herein can have the following formula:

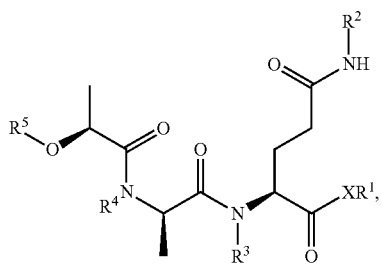

or a pharmaceutically acceptable acid or salt thereof, wherein $R^1$ is substituted or unsubstituted alkyl or substituted or unsubstituted aryl; $R^2$, $R^3$, $R^4$, and $R^5$ are each independently selected from H, substituted or unsubstituted alkyl and substituted or unsubstituted aryl; and X is O or $NR^6$, wherein $R^6$ is hydrogen, substituted or unsubstituted alkyl, or substituted or unsubstituted aryl. Optionally, X is O. Optionally, $R^1$ is $C_1$-$C_{18}$ linear alkyl or an amino acid. In some cases, the oligopeptide has one of the following structures:

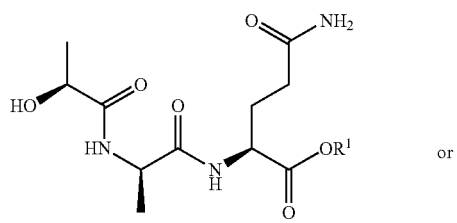

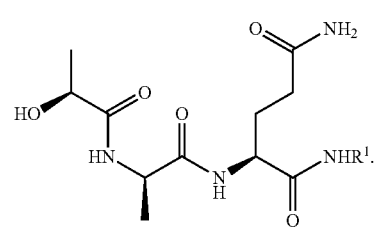

In some cases, the oligopeptide has one of the following structures:

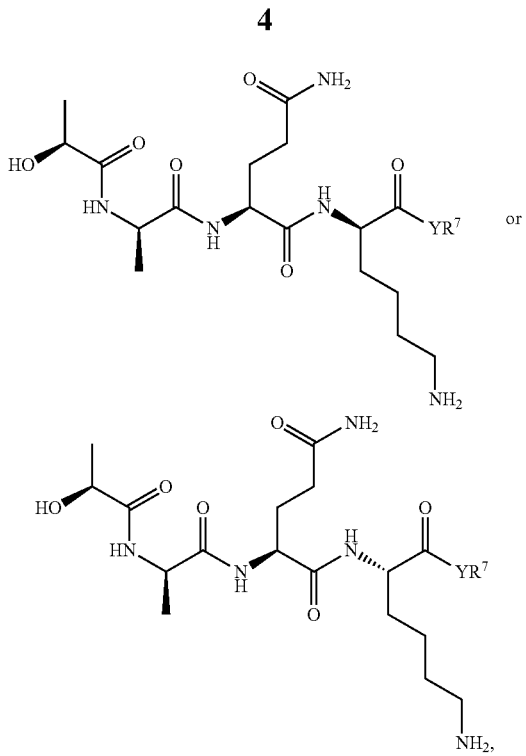

wherein $R^7$ is substituted or unsubstituted alkyl or substituted or unsubstituted aryl; and Y is O or $NR^8$, wherein $R^8$ is hydrogen, substituted or unsubstituted alkyl, or substituted or unsubstituted aryl. Optionally, the oligopeptide is L-lactate-D-alanine-L-glutamine-hexadecyl ester Also described herein are compositions comprising a compound as described herein. Optionally, the composition is a pharmaceutical composition comprising at least one oligopeptide described herein and a pharmaceutically acceptable carrier. In some cases, the composition comprises at least one oligopeptide as described herein and animal feed. The at least one oligopeptide can be present in the composition in an amount of from about 0.01 mg/kg to 5 mg/kg. Optionally, the composition further comprises an additive used in an animal diet (e.g., an enzyme, a probiotic, a prebiotic, an antioxidant, an antibiotic growth promoter, a coloring agent, or a combination thereof).

Further described herein are methods for reducing intestinal inflammation in a human, comprising administering a pharmaceutical composition as described herein to a human having intestinal inflammation, wherein the administration reduces the intestinal inflammation. The methods can further comprise selecting a human having a disease or condition associated with intestinal inflammation (e.g., inflammatory bowel disease, irritable bowel syndrome, Crohn's disease, ulcerative colitis, or a bacterial infection). Methods for promoting growth in animal are also provided herein, wherein the methods comprise administering the compounds or compositions as described herein, wherein the administration enhances the growth of the animal. Also provided herein are methods for enhancing feed conversion in an animal, wherein the methods comprise administering the compounds or compositions as described herein, wherein the administration enhances the feed conversion in the animal.

The details of one or more embodiments are forth in the drawings and the description below. Other features, objects, and advantages will be apparent from the description and drawings, and from the claims.

DETAILED DESCRIPTION

Figure 1:
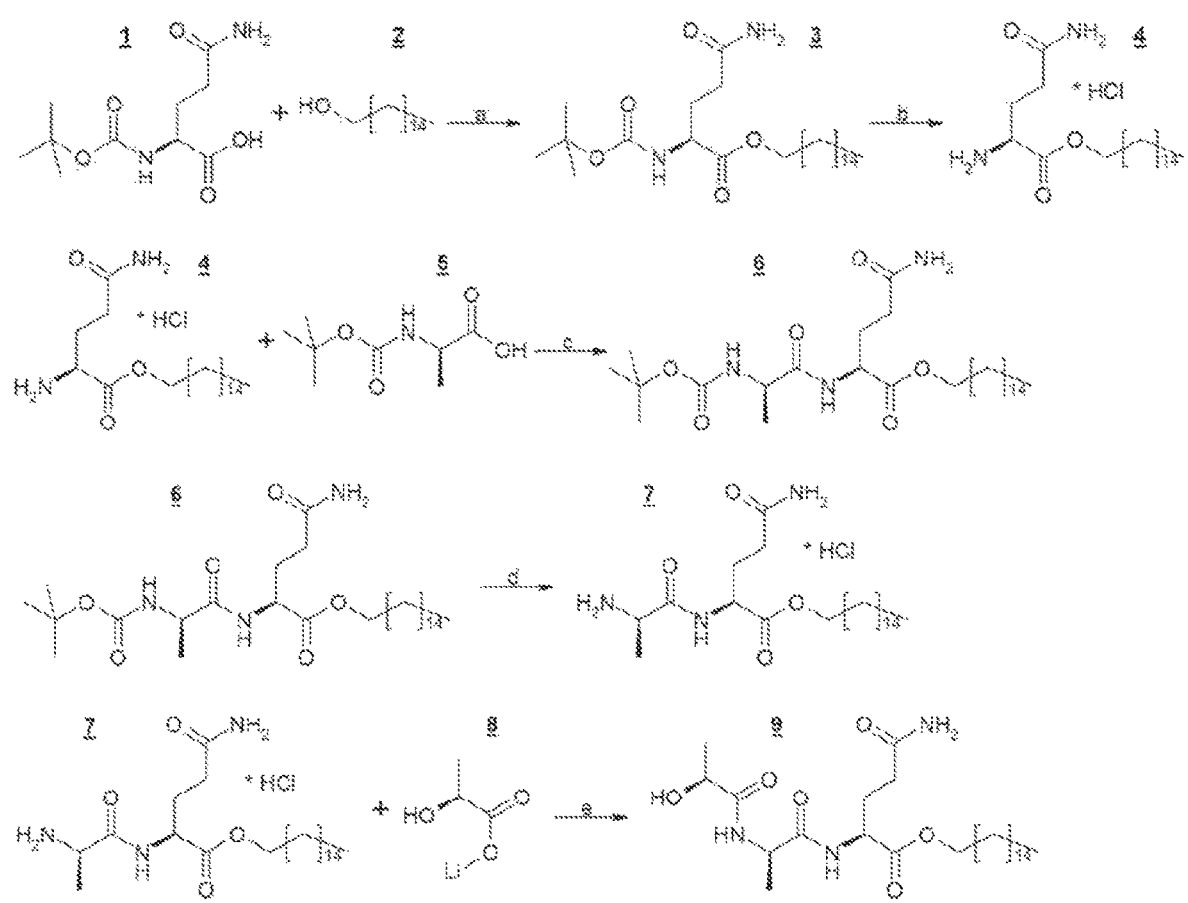
FIG. 1 is a schematic depicting the synthesis of L-lactate-D-alanine-L-glutamine palmityl ester (Lactate-DiPeptide-Palmityl ester, LDPP).

Provided herein are compositions containing a lipophilic enantiomer of desacetylglucosamine muramyl dipeptide (MDP) (e.g., L-lactate-D-alanine-L-glutamine-hexadecyl ester). This compound improves i) binding strength to the cognate intracellular receptor(s) by enlarging the dipeptide via the additional mirror l-lactate moiety; and ii) maximizes intracellular targeting and active dipeptide release via the increased membrane fluidity provided by the lower-melting hexadecyl (palmityl) aliphatic lipid.

When administered to humans or animals the compositions containing the lipophilic enantiomer of MDP reduce inflammation, promote growth and improve feed conversion. Therefore, methods for reducing inflammation in humans and animals, and methods for promoting growth and enhancing feed conversion in animals are provided. In accordance with the methods, the lipophilic enantiomer of MDP is combined with a pharmaceutically acceptable acid or addition salt thereof, a pharmaceutical carrier or animal feed, which is then administered to the animal or human in a sufficient amount to achieve the desired reduction in inflammation, promotion of growth or improvement of feed conversion.

I. Compounds

Described herein are oligopeptide analogs of desacetylglucosamine muramyl dipeptide (MDP). The analogs can include an L-lactate-D-alanine-L-glutamine moiety bonded to an organic lipid molecule, and any pharmaceutically acceptable acid or salt thereof. In some cases, the analog does not contain the N-acetylglucosamine moiety of MDP.

In some cases, the compounds described herein includes Formula I:

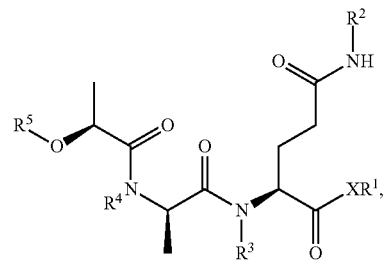

wherein:

In Formula I, $R^1$ is substituted or unsubstituted alkyl or substituted or unsubstituted aryl. Optionally, $R^1$ is a $C_1$-$C_{18}$ linear alkyl. Optionally, $R^1$ is an amino acid, such as a lysine group (D-lysine or L-lysine).

Also in Formula I, $R^2$, $R^3$, $R^4$, and $R^5$ are each independently selected from H, substituted or unsubstituted alkyl and substituted or unsubstituted aryl.

Additionally in Formula I, X is O or $NR^6$, wherein $R^6$ is hydrogen, substituted or unsubstituted alkyl, or substituted or unsubstituted aryl.

Optionally, the compounds of Formula I can include compounds according to Structure I-A:

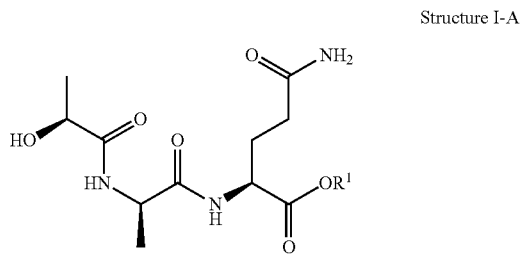

Structure I-A

In Structure I-A, $R^1$ is defined as above for Formula I.

Optionally, the compounds of Formula I can include compounds according to Structure I-B:

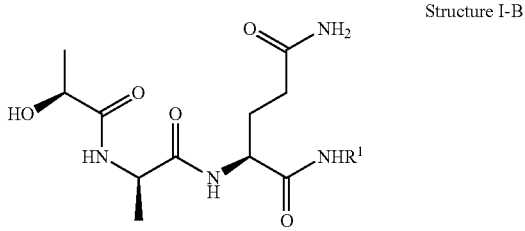

Structure I-B

In Structure I-B, $R^1$ is defined as above for Formula I.

Optionally, the compounds of Formula I can include compounds according to Structure I-C or Structure I-D:

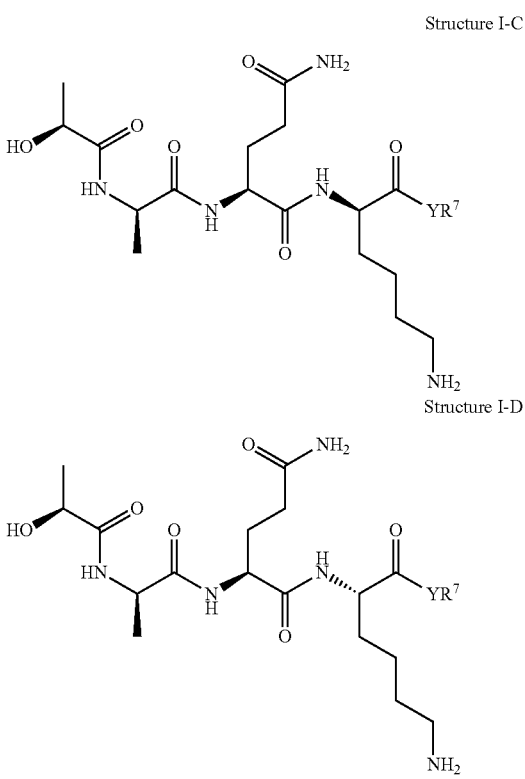

Structure I-C

Structure I-D

In Structure I-C and Structure I-D, $R^7$ is substituted or unsubstituted alkyl or substituted or unsubstituted aryl. Also in Structure I-C and Structure I-D, Y is O or $NR^B$, wherein $R^8$ is hydrogen, substituted or unsubstituted alkyl, or substituted or unsubstituted aryl.

The alkyl can be a straight-chain alkyl or a branched-chain alkyl. In some cases, the straight-chain alkyl can be a $C_1$-$C_{18}$ alkyl (e.g., a $C_2$-$C_{17}$ alkyl or a $C_3$-$C_{16}$ alkyl). Examples of suitable alkyl groups include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, or octadecyl. In some cases, the oligopeptide is L-lactate-D-alanine-L-glutamine-hexadecyl ester, also referred to herein as L-lactate-D-alanine-L-glutamine palmityl ester (Lactate-DiPeptide-Palmityl ester, LDPP) or as hexadecyl (2S)-5-amino-2-[[(2R)-2-[[(2S)-2-hydroxy-propanoyl]amino]propanoyl]amino]-5-oxo-pentanoate.

Optionally, the aryl group includes a phenyl group. Optionally, the aryl group can include additional fused rings, for example, naphthalene, anthracene, and pyrene. The aryl and heteroaryl groups can be attached at any position on the ring, unless otherwise noted.

The alkyl and aryl groups used herein can be substituted or unsubstituted. As used herein, the term substituted includes the addition of a functional group to a position attached to the main chain of the alkyl or aryl group, e.g., the replacement of a hydrogen by one of these molecules. Examples of substitution groups include, but are not limited to, hydroxy, halogen (e.g., F, Br, Cl, or I), and carboxyl groups. Conversely, as used herein, the term unsubstituted indicates the alkyl or aryl group has a full complement of hydrogens, i.e., commensurate with its saturation level, with no substitutions, e.g., linear hexadecyl (—$(CH_4)_{15}$—$CH_3$).

II. Methods of Making the Compounds

The compounds described herein can be prepared in a variety of ways. The compounds can be synthesized using various synthetic methods. At least some of these methods are known in the art of synthetic organic chemistry. The compounds described herein can be prepared from readily available starting materials. Optimum reaction conditions may vary with the particular reactants or solvents used, but such conditions can be determined by one skilled in the art.

Variations on Formula I and the compounds described herein include the addition, subtraction, or movement of the various constituents as described for each compound. Similarly, when one or more chiral centers are present in a molecule, all possible chiral variants are included. Additionally, compound synthesis can involve the protection and deprotection of various chemical groups. The use of protection and deprotection, and the selection of appropriate protecting groups can be determined by one skilled in the art. The chemistry of protecting groups can be found, for example, in Wuts, Greene's Protective Groups in Organic Synthesis, 5th. Ed., Wiley & Sons, 2014, which is incorporated herein by reference in its entirety.

Reactions to produce the compounds described herein can be carried out in solvents, which can be selected by one of ordinary skill in the art of organic synthesis. Solvents can be substantially nonreactive with the starting materials (reactants), the intermediates, or products under the conditions at which the reactions are carried out, i.e., temperature and pressure. Reactions can be carried out in one solvent or a mixture of more than one solvent. Product or intermediate formation can be monitored according to any suitable method known in the art. For example, product formation can be monitored by spectroscopic means, such as nuclear magnetic resonance spectroscopy (e.g., $^1$H-NMR or $^{13}$C-NMR), infrared spectroscopy (IR), spectrophotometry (e.g., UV-visible), or mass spectrometry (MS), or by chromatography such as high performance liquid chromatography (HPLC) or thin layer chromatography (TLC).

Exemplary methods for synthesizing compounds as described herein are provided in Example 1 below, depicting the synthesis of LDPP by way of example.

III. Formulations

Also described herein are compositions including a compound of Formula I as described herein (e.g., at least one oligopeptide analog of MDP) and a carrier. Optionally, the composition includes L-lactate-D-alanine-L-glutamine palmityl ester (LDPP) and a carrier.

In some cases, the composition includes a compound of Formula I as described herein, such as, for example, LDPP, and animal feed. Any suitable animal feed can be used, including animal feed that includes one or more of maize, sorghum, wheat, barley, oats, soybean meal, fish meal, and/or whey. Optionally, the compound of Formula I can be included in the composition in an amount of from about 0.01 mg/kg to 5 mg/kg (e.g., 0.05 mg/kg to 4.5 mg/kg, 0.1 mg/kg to 4 mg/kg, 0.15 mg/kg to 3.5 mg/kg, or 0.2 mg/kg to 3 mg/kg). In some examples, the compound of Formula I, such as LDPP, can be included in a composition including animal feed in an amount of 0.01 mg/kg, 0.05 mg/kg, 0.1 mg/kg, 0.15 mg/kg, 0.2 mg/kg, 0.25 mg/kg, 0.3 mg/kg, 0.35 mg/kg, 0.4 mg/kg, 0.45 mg/kg, 0.5 mg/kg, 0.55 mg/kg, 0.6 mg/kg, 0.65 mg/kg, 0.7 mg/kg, 0.75 mg/kg, 0.8 mg/kg, 0.85 mg/kg, 0.9 mg/kg, 0.95 mg/kg, 1.0 mg/kg, 1.5 mg/kg, 2.0 mg/kg, 2.5 mg/kg, 3.0 mg/kg, 3.5 mg/kg, 4.0 mg/kg, 4.5 mg/kg, or 5.0 mg/kg. The animal feed composition can further include additives used in animal diets, including enzymes, probiotics, prebiotics, antioxidants, antibiotic growth promoters, and coloring agents.

The compositions described herein may be suitable for oral, parenteral, inhalation spray, topical, rectal, nasal, buccal, vaginal, or implanted reservoir administration. The term parenteral as used herein includes subcutaneous, intradermal, intravenous, intramuscular, intra-articular, intra-synovial, intrasternal, intrathecal, intrahepatic, intralesional and intracranial injection or infusion techniques. Optionally, the compositions described herein can administered orally, topically, intranasally, intravenously, subcutaneously, intradermally, transdermally, intramucosally, intramuscularly, by inhalation spray, rectally, nasally, sublingually, buccally, vaginally or via an implanted reservoir.

The compounds described herein or derivatives thereof can be provided in a pharmaceutical composition. In some cases, the compositions are pharmaceutical compositions that include a compound of Formula I and a pharmaceutically acceptable carrier. Depending on the intended mode of administration, the pharmaceutical composition can be in the form of solid, semi-solid or liquid dosage forms, such as, for example, tablets, suppositories, pills, capsules, powders, liquids, or suspensions, preferably in unit dosage form suitable for single administration of a precise dosage. The compositions will include a therapeutically effective amount of the compound described herein or derivatives thereof in combination with a pharmaceutically acceptable carrier and, in addition, may include other medicinal agents, pharmaceutical agents, carriers, or diluents. By pharmaceutically acceptable is meant a material that is not biologically or otherwise undesirable, which can be administered to an individual along with the selected compound without causing unacceptable biological effects or interacting in a deleterious manner with the other components of the pharmaceutical composition in which it is contained.

The compositions can include one or more of the compounds described herein and a pharmaceutically acceptable carrier. As used herein, the term carrier encompasses any excipient, diluent, filler, salt, buffer, stabilizer, solubilizer, lipid, stabilizer, or other material well known in the art for use in pharmaceutical formulations. The choice of a carrier for use in a composition will depend upon the intended route of administration for the composition. The preparation of pharmaceutically acceptable carriers and formulations containing these materials is described in, e.g., Remington: The Science and Practice of Pharmacy, Adeboye Adejare ed., 23rd Ed., Academic Press (2021). Examples of physiologically acceptable carriers include buffers, such as phosphate buffers, citrate buffer, and buffers with other organic acids; antioxidants including ascorbic acid; low molecular weight (less than about 10 residues) polypeptides; proteins, such as serum albumin, gelatin, or immunoglobulins; hydrophilic polymers, such as polyvinylpyrrolidone; amino acids such as glycine, glutamine, asparagine, arginine or lysine; monosaccharides, disaccharides, and other carbohydrates, including glucose mannose, or dextrins; chelating agents, such as EDTA; sugar alcohols, such as mannitol or sorbitol; salt-forming counterions, such as sodium; and/or nonionic surfactants, such as TWEEN® (ICI, Inc.; Bridgewater, New Jersey), polyethylene glycol (PEG), and PLURONICS™ (BASF; Florham Park, NJ).

Compositions containing the compound described herein or derivatives thereof suitable for parenteral injection may comprise physiologically acceptable sterile aqueous or nonaqueous solutions, dispersions, suspensions or emulsions, and sterile powders for reconstitution into sterile injectable solutions or dispersions. Examples of suitable aqueous and nonaqueous carriers, diluents, solvents or vehicles include water, ethanol, polyols (propyleneglycol, polyethyleneglycol, glycerol, and the like), suitable mixtures thereof, vegetable oils (such as olive oil) and injectable organic esters such as ethyl oleate. Proper fluidity can be maintained, for example, by the use of a coating such as lecithin, by the maintenance of the required particle size in the case of dispersions and by the use of surfactants.

These compositions may also contain adjuvants, such as preserving, wetting, emulsifying, and dispensing agents. Prevention of the action of microorganisms can be promoted by various antibacterial and antifungal agents, for example, parabens, chlorobutanol, phenol, sorbic acid, and the like. Isotonic agents, for example, sugars, sodium chloride, and the like may also be included. Prolonged absorption of the injectable pharmaceutical form can be brought about by the use of agents delaying absorption, for example, aluminum monostearate and gelatin.

Solid dosage forms for oral administration of the compounds described herein or derivatives thereof include capsules, tablets, pills, powders, and granules. In such solid dosage forms, the compounds described herein or derivatives thereof is admixed with at least one inert customary excipient (or carrier), such as sodium citrate or dicalcium phosphate, or (a) fillers or extenders, as for example, starches, lactose, sucrose, glucose, mannitol, and silicic acid, (b) binders, as for example, carboxymethylcellulose, alginate, gelatin, polyvinylpyrrolidone, sucrose, and acacia, (c) humectants, as for example, glycerol, (d) disintegrating agents, as for example agar-agar, calcium carbonate, potato or tapioca starch, alginic acid, certain complex silicates, and sodium carbonate, (e) solution retarders, as for example, paraffin, (f) absorption accelerators, as for example, quaternary ammonium compounds, (g) wetting agents, as for example, cetyl alcohol, and glycerol monostearate, (h) adsorbents, as for example, kaolin and bentonite, and (i) lubricants, as for example, talc, calcium stearate, magnesium stearate, solid polyethylene glycols, sodium lauryl sulfate, or mixtures thereof. In the case of capsules, tablets, and pills, the dosage forms may also comprise buffering agents.

Solid compositions of a similar type may also be employed as fillers in soft and hard-filled gelatin capsules using such excipients as lactose or milk sugar as well as high molecular weight polyethyleneglycols, and the like.

Solid dosage forms such as tablets, dragees, capsules, pills, and granules can be prepared with coatings and shells, such as enteric coatings and others known in the art. They may contain opacifying agents and can also be of such composition that they release the active compound or compounds in a certain part of the intestinal tract in a delayed manner. Examples of embedding compositions that can be used are polymeric substances and waxes. The active compounds can also be in micro-encapsulated form, if appropriate, with one or more of the above-mentioned excipients.

Liquid dosage forms for oral or intravenous administration of the compounds described herein or derivatives thereof include pharmaceutically acceptable emulsions, solutions, suspensions, syrups, and elixirs. In addition to the active compounds, the liquid dosage forms may contain inert diluents commonly used in the art, such as water or other solvents, solubilizing agents, and emulsifiers, as for example ethyl alcohol, isopropyl alcohol, ethyl carbonate, ethyl acetate, benzyl alcohol, benzyl benzoate, propyleneglycol, 1,3-butyleneglycol, dimethylformamide, oils, in particular, cottonseed oil, groundnut oil, corn germ oil, olive oil, castor oil, sesame oil, glycerol, tetrahydrofurfuryl alcohol, polyethyleneglycols, and fatty acid esters of sorbitan, or mixtures of these substances, and the like.

Besides such inert diluents, the composition can also include additional agents, such as wetting, emulsifying, suspending, sweetening, flavoring, or perfuming agents.

Suspensions, in addition to the active compounds, may contain additional agents, as for example ethoxylated isostearyl alcohols, polyoxyethylene sorbitol and sorbitan esters, microcrystalline cellulose, aluminum metahydroxide, bentonite, agar-agar and tragacanth, or mixtures of these substances, and the like.

As described above, the one or more compounds described herein can be provided with a nebulizer, which is an instrument that generates very fine liquid particles of substantially uniform size in a gas. The liquid containing the one or more compounds described herein can be dispersed as droplets about 5 mm or less in diameter in the form of a mist. The small droplets can be carried by a current of air or oxygen through an outlet tube of the nebulizer. The resulting mist can penetrate into the respiratory tract of the patient.

Additional inhalants useful for delivery of the compounds described herein include infra-oral sprays, mists, metered dose inhalers, and dry powder generators (See Gonda, *J. Pharm. Sci.* 89:940-945, 2000, which is incorporated herein by reference in its entirety, at least, for inhalation delivery methods taught therein). For example, a powder composition containing the one or more compounds as described herein, with or without a lubricant, carrier, or propellant, can be administered to a patient. The delivery of the one or more compounds in powder form can be carried out with a conventional device for administering a powder pharmaceutical composition by inhalation.

Compositions of the compounds described herein or derivatives thereof for rectal administrations are optionally suppositories, which can be prepared by mixing the compounds with suitable non-irritating excipients or carriers, such as cocoa butter, polyethyleneglycol or a suppository wax, which are solid at ordinary temperatures but liquid at body temperature and, therefore, melt in the rectum or vaginal cavity and release the active component.

Dosage forms for topical administration of the compounds described herein or derivatives thereof include ointments, powders, sprays, and inhalants. The compounds described herein or derivatives thereof are admixed under sterile conditions with a physiologically acceptable carrier and any preservatives, buffers, or propellants as may be required. Ophthalmic formulations, ointments, powders, and solutions are also contemplated as being within the scope of the compositions.

As noted above, the compositions can include one or more of the compounds described herein or pharmaceutically acceptable salts thereof. As used herein, the term pharmaceutically acceptable salt refers to those salts of the compound described herein or derivatives thereof that are, within the scope of sound medical judgment, suitable for use in contact with the tissues of subjects without undue toxicity, irritation, allergic response, and the like, commensurate with a reasonable benefit/risk ratio, and effective for their intended use, as well as the zwitterionic forms, where possible, of the compounds described herein. The term salts refers to the relatively non-toxic, inorganic and organic acid addition salts of the compounds described herein. These salts can be prepared in situ during the isolation and purification of the compounds or by separately reacting the purified compound in its free base form with a suitable organic or inorganic acid and isolating the salt thus formed. Representative salts include the hydrobromide, hydrochloride, sulfate, bisulfate, nitrate, acetate, oxalate, valerate, oleate, palmitate, stearate, laurate, borate, benzoate, lactate, phosphate, tosylate, citrate, maleate, fumarate, succinate, tartrate, naphthylate mesylate, glucoheptonate, lactobionate, methane sulphonate, and laurylsulphonate salts, and the like. These may include cations based on the alkali and alkaline earth metals, such as sodium, lithium, potassium, calcium, magnesium, and the like, as well as non-toxic ammonium, quaternary ammonium, and amine cations including, but not limited to ammonium, tetramethylammonium, tetraethylammonium, methylamine, dimethylamine, trimethylamine, triethylamine, ethylamine, and the like. (See S. M. Barge et al., *J. Pharm. Sci.* (1977) 66, 1, which is incorporated herein by reference in its entirety, at least, for compositions taught therein.

Administration of the compounds and compositions described herein or pharmaceutically acceptable salts thereof can be carried out using therapeutically effective amounts of the compounds and compositions described herein or pharmaceutically acceptable salts thereof as described herein for periods of time effective to treat a disorder. The effective amount of the compounds and compositions described herein or pharmaceutically acceptable salts thereof as described herein may be determined by one of ordinary skill in the art and includes exemplary administrations for an animal or human at a dose that delivers the active compound to the subject in an amount between about $0.01 \times (BW/20)^{3/4}$ µg and $10,000 \times BW/20)^{3/4}$ µg per day, wherein BW is the body weight of the subject in grams. This amount may be administered in a single dose or in the form of individual divided doses, such as from 1 to 4 times per day.

Those of skill in the art will understand that the specific dose level and frequency of dosage for any particular subject may be varied and will depend upon a variety of factors, including the activity of the specific compound employed, the metabolic stability and length of action of that compound, the species, age, body weight, general health, sex and diet of the subject, the mode and time of administration, rate of excretion, drug combination, and severity of the particular condition.

The precise dose to be employed in the formulation will also depend on the route of administration, and the seriousness of the disease or disorder, and should be decided according to the judgment of the practitioner and each subject's circumstances. Effective doses can be extrapolated from dose-response curves derived from in vitro or animal model test systems. Further, depending on the route of administration, one of skill in the art would brow how to determine doses that result in a plasma concentration for a desired level of response in the cells, tissues and/or organs of a subject.

IV. Methods of Use

Provided herein are methods that include administering to a subject an effective amount of one or more of the compounds or pharmaceutical compositions described herein, or a pharmaceutically acceptable salt thereof. The expression "effective amount," when used to describe an amount of compound in a method, refers to the amount of a compound that achieves the desired pharmacological effect or other effect, for example, an amount that results in enhanced growth or feed conversion.

Methods for promoting growth in an animal are provided herein, along with methods for enhancing feed conversion in an animal. The methods comprise administering a compound or composition as described herein to the animal. The administration can enhance the growth of the animal and/or enhance the feed conversion of the animal as compared to a control (an animal not administered a compound or composition as described herein).

The compounds and compositions described herein or pharmaceutically acceptable salts thereof are useful for treating and/or preventing a disease or condition associated with intestinal inflammation. As such, provided herein are methods for reducing intestinal inflammation in a human comprising administering a composition as described herein (e.g., a pharmaceutical composition as described herein) to a human having intestinal inflammation, wherein the administration reduces the intestinal inflammation. Optionally, the human has or is at risk of developing inflammatory bowel disease, irritable bowel syndrome, Crohn's disease, ulcerative colitis, or a bacterial infection (such as *Clostridium difficile* infection). The methods can further include selecting a human having a disease or condition associated with intestinal inflammation (e g inflammatory bowel disease, irritable bowel syndrome, Crohn's disease, ulcerative colitis, or a bacterial infection).

The methods described herein are useful for treating the diseases and conditions described herein in humans, including, without limitation, pediatric and geriatric populations, and in animals, e.g., veterinary application.

V. Kits

Also provided herein are kits for promoting growth in an animal are provided herein, along with methods for enhancing feed conversion in an animal. A kit can include any of the compounds or compositions described herein. For example, a kit can include a compound of Formula I. A kit can further include one or more additional agents, such as animal feed and/or animal feed supplements. A kit can include an oral formulation of any of the compounds or compositions described herein. A kit can additionally include directions for use of the kit (e.g., instructions for treating a subject), a container, a means for administering the compounds or compositions, and/or a carrier.

Also provided herein are kits for treating or preventing a disease or condition associated with intestinal inflammation in a subject. A kit can include any of the compounds or compositions described herein. For example, a kit can include a compound of Formula I. A kit can further include one or more additional agents, such as anti-inflammatory agents. A kit can include an oral formulation of any of the compounds or compositions described herein. A kit can additionally include directions for use of the kit (e.g., instructions for treating a subject), a container, a means for administering the compounds or compositions, and/or a carrier.

As used herein the terms treatment, treat, or treating refer to a method of reducing one or more symptoms of a disease or condition. Thus in the disclosed method, treatment can refer to a 10%, 20%, 30%, 40%, 50%, 60%, 70%, 80%, 90%, or 100% reduction in the severity of one or more symptoms of the disease or condition. For example, a method for treating a disease is considered to be a treatment if there is a 10% reduction in one or more symptoms or signs of the disease in a subject as compared to a control. As used herein, control refers to the untreated condition. Thus the reduction can be a 10%, 20%, 30%, 40%, 50%, 60%, 70%, 80%, 90%, 100%, or any percent reduction in between 10% and 100% as compared to native or control levels. It is understood that treatment does not necessarily refer to a cure or complete ablation of the disease, condition, or symptoms of the disease or condition.

As used herein, the terms prevent, preventing, and prevention of a disease or disorder refer to an action, for example, administration of a composition or therapeutic agent, that occurs before or at about the same time a subject begins to show one or more symptoms of the disease or disorder, which inhibits or delays onset or severity of one or more symptoms of the disease or disorder.

As used herein, references to decreasing, reducing, or inhibiting include a change of 10%, 20%, 30%, 40%, 50%, 60%, 70%, 80%, 90% or greater as compared to a control level. Such terms can include, but do not necessarily include, complete elimination.

As used throughout, by subject is meant an individual. Preferably, the subject is a mammal such as a primate, and, more preferably, a human. Non-human primates are subjects as well. The term subject includes domesticated animals, such as cats, dogs, etc., livestock (for example, cattle, horses, pigs, sheep, goats, etc.), farmed birds (chickens, turkeys, pigeons, geese, etc.), and laboratory animals (for example, ferret, chinchilla, mouse, rabbit, rat, gerbil, guinea pig, etc.). Thus, veterinary uses and medical formulations are contemplated herein. Non-human subjects are also referred to as animals in this disclosure.

Throughout this application, various publications are referenced. The disclosures of these publications in their entireties are hereby incorporated by reference into this application.

The following examples will serve to further illustrate the present invention without, at the same time, however, constituting any limitation thereof. On the contrary, it is to be clearly understood that resort may be had to various embodiments, modifications and equivalents thereof which, after reading the description herein; may suggest themselves to those skilled in the art without departing from the spirit of the invention.

EXAMPLES

Example 1: Synthesis of L-lactate-D-alanine-L Glutamine Palmityl Ester (LDPP)

L-lactate-D-alanine-L-glutamine palmityl ester (LDPP) was synthesized according to the method detailed below, and depicted in FIG. 1.

The hexadecyl ester of tert-butyloxycarbonyl (BOC) L-glutamine was prepared in step a by esterification reaction of BOC-glutamine (1) with 1-hexadecanol (2) in tetrahydrofuran, in the presence of dicyclohexyl carbodiimide, to yield hexadecyl BOC-L-glutamine (3). The BOC protecting group was removed in step b by treatment of intermediate (3) dissolved in methylene chloride with hydrogen chloride gas to yield the hydrochloride salt of hexadecyl L-glutamine (4). Intermediate (4) was dissolved in N,N-dimethylformamide, N,N-diisopropylethylamine was added followed by BOC D-alanine (5) and the coupling agent benzotriazole-1-yloxytris(pyrrolidino)phosphonium hexafluorophosphate (PyBOP), to yield in step c the BOC-protected hexadecyl dipeptide 7. Intermediate (7) was purified by column chromatography and the BOC group was removed in step d by treatment of the product with hydrogen chloride gas to yield hexadecyl dipeptide 7. To intermediate (7) dissolved in N,N-dimethylformamide in the presence of N,N-diisopropylethylamine and 2-(1H-benzotriazol-1-yl)-1,1,3,3-tetramethyluronium hexafluorophosphate (Hexafluorophosphate Benzotriazole Tetramethyl Uronium, HBTU), lithium L-lactate (8) was added, and step e yielded the final product L-lactate-D-alanine-L-glutamine hexadecyl ester (9). The white L-lactate-D-alanine-L-glutamine palmityl ester with a MW of 513.72 g/mol was greater than 98% pure, as determined by $^1$H-Nuclear Magnetic Resonance analysis.

Example 2: Impact of LDPP on Growth Rate and Feed Conversion in Chickens

The objective of this experiment was to evaluate if supplementation of feed with L-lactate-D-alanine-L-glutamine palmityl ester (LDPP) at 0.2 mg/kg feed increases the growth rate and/or improves the feed conversion in broiler chickens, i.e., if it promotes growth by making broiler chickens grow faster and/or require less feed for the same amount of gain in body weight. A secondary objective was to compare the effect of LDPP to that of bacitracin, an industry-standard growth promoting antibiotic.

Experimental Design

Freshly hatched female Ross 708 broiler chickens were housed for as single flock for 21 days on a floor pen with used bedding. All chickens received crumbled untreated standard Aviagen 708 starter and grower feeds during this time, with 80% recommended crude protein and without anti-coccidial supplement. After 3 weeks, the chickens were grouped into 38 replicate floor pens of 25 chickens with fresh bedding. Chickens were fed for 24 days from day 21 through termination on day 44 standard crumbled finisher Aviagen 708 finisher feed with 100% protein and 0.0125% amprolium anti-coccidial inclusion. Feed and water were available ad libitum throughout the trial. Thirteen pens each were assigned to untreated controls (feed without supplement) and LDPP-treatment (0.2 mg LDPP/kg feed), and 12 pens were assigned to bacitracin treatment (50 mg bacitracin/kg feed). The experimental unit was the pen rather than individual chickens. Pen weights of chickens were determined on day 21 and 44. Finisher feed uptake was be recorded, and on day 44 residual feed was determined, and the experiment was terminated.

Statistical Analyses

For constant time analyses of the complete 24-day duration of the feeding experiment, the overall (true) feed conversion for each treatment group was determined by dividing total consumed feed by total weight gains of all pens of each treatment group.

For constant body weight gain analyses, the time on feed of the bacitracin and LDPP treated groups was modeled to match the weight gain of the untreated control group. Based on the closely matching body weights and weight gains of standard female Ross 708 broilers, body weight gains per chicken on the last day 44 of the experiment were calculated as the 0.04781 fraction of pen body weight gain day 21-44/surviving chickens per pen. The mean body weight gain of each treatment group was adjusted to the control mean by iteratively subtracting the same fractions of the calculated day 44 body weight gain of all pens of a treatment until a single fractional day was found that produced a weight gain matching with the control group. Similarly, feed consumption per chicken on day 44 was calculated as the 0.05867 fraction of pen feed uptake day 21-44/surviving chickens per pen. Mean feed uptake per treatment group was then calculated by subtracting the previously found fractional daily feed uptake from each pen.

Body weight gain and feed consumption data were analyzed by one-way ANOVA and Tukey Honest True Difference connection for multiple comparisons. Group differences in feed conversion rates were evaluated from pen FCR data by non-parametric Mann Whitney U test.

Results and Conclusions

Figure 2:
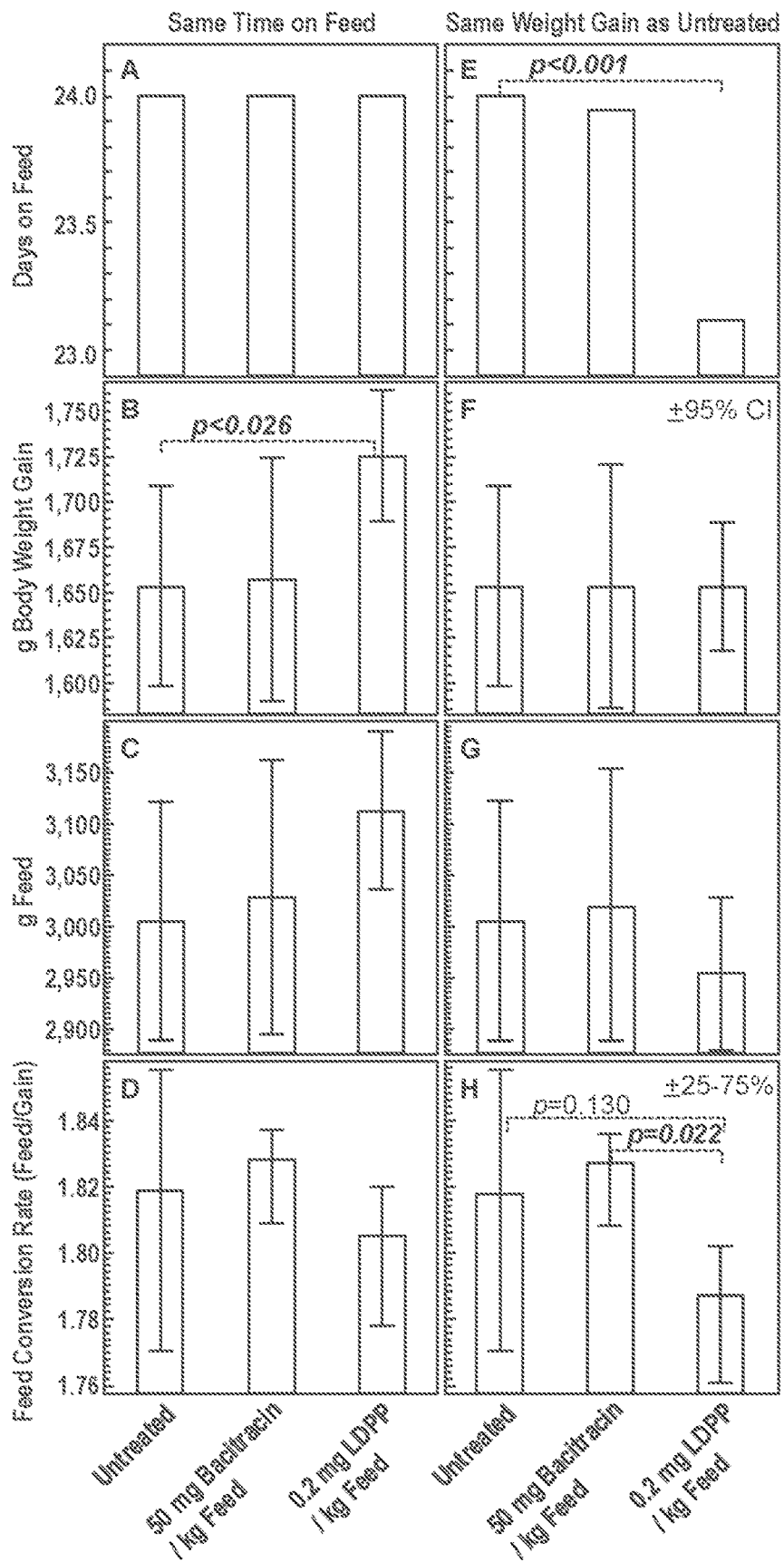
FIG. 2 contains bar graphs showing the evaluation of the growth promotion effect of L-lactate-D-alanine-L-glutamine palmityl ester (LDPP) in broiler chickens. (A) The experimental diets were fed from start on day 21 through termination on day 44 (24 days constant tune). (B) Body weight gain per chicken on constant time. Data shown are means±95% confidence interval (95% CI). (C) Total feed consumed per chicken on constant time, means±95% CI. (D) Feed conversion rate as determined by dividing total consumed feed by total weight gains of all chickens on constant time of each group. Error bars indicate 25-75 percentiles of calculated feed conversions of individual pens. (E) Modeling of time on feed required for weight gain identical to the untreated controls (1,653 g constant weight gain). (F) Body weight gain per chicken on constant weight gain, means±95% CI. (G) Total feed consumed per chicken on constant weight gain, means±95% CI. (H) Feed conversion rate for constant weight gain of each treatment group. Morbidity and mortality rates did not differ significantly between groups. Relevant differences between treatment groups are indicated by dashed brackets and the corresponding p value.

LDPP, supplemented at 0.2 mg/kg feed, significantly improves the growth rate of broiler chickens by increasing the weight gain of LDPP-treated chickens by 4.4% to 1,725 gas compared to the 1,653 g weight gain of untreated control chickens. This resulted in highly significant, nearly a day more rapid growth of the LDPP-treated chickens as compared to the controls (23.13 vs 24 days). The feed conversion rate of LDPP-treated versus untreated chickens is improved at constant time from 1.818 to 1.805, and more strongly by 1.7% to 1.787 at constant body weight gain. The growth promoting effect of LDPP is significantly stronger than that of bacitracin, an industry-standard growth promoting antibiotic, which showed a significantly higher feed conversion rate of 1.827 at constant body weight gain. The results are shown in FIG. 2.

Example 3: Impact of LDPP on Growth Rate and Feed Conversion in Pigs

The objective of this experiment was to evaluate if supplementation of feed with L-lactate-D-alanine-L-glutamine palmityl ester (LDPP) at 0.2 mg/kg feed increases the growth rate and/or improves the feed conversion in freshly weaned nursery pigs.

Experimental Design

Male pigs (barrows) were used in this study. Pigs were weaned at approximately 3 weeks of age, transferred to the nursery, and randomly allotted to 24 nursery pens with 4 pigs per pen. One of 2 dietary treatments, untreated controls (feed without supplement) or LDPP-treatment (0.2 mg LDPP/kg feed), was assigned to each pen, such that 12 pens of 4 pigs were used to evaluate the effect of each diet. Premixes of the treatment compounds were added at 0.1% to mixed diets, which were then pelleted. Phase 1 diet was fed at 6 lb/pig from day 0 to approximately day 8 post-weaning. On day 8 post-weaning, pigs were switched to 12 lb/pig Phase 2 diet which expired approximately on day 18. Once the Phase 2 diet had been consumed, pigs were switched to Phase 3 diet and maintained until termination of the study on day 42. No antibiotics were added to any diet. Diets were formulated to meet or exceed all the nutrient requirements based on the 2012 NRC specifications. Pigs received diets and water ad libitum. Pigs were weighed individually on days 0 and 42 of the experiment. Feed intake per pen was monitored for the weigh period. Although individual pig weights were obtained, the pen was the experimental unit. On day 42, the study was terminated and untreated pigs were retained in the food chain while the treatment pigs were euthanized.

Statistical Analyses

Pen data were converted into individual pig data by dividing by the number of pigs. For three pens in which pigs were euthanized, a time-fractional pig number was used. Body weight gain and calculated feed consumption data were analyzed by pairwise T-test. The overall (true) feed conversion for each treatment was determined by dividing total consumed feed by total weight gains of all pens of each treatment. Treatment differences in feed conversion were statistically evaluated by non-parametric Mann Whitney U test of pen feed conversion data.

For constant body weight gain analyses, the time on feed of the LDPP treated group was modeled to match the weight gain of the untreated control group. Daily body weights and weight gains were modeled by linear interpolation between weights on days 0 and 42. The mean body weight gain of the LDPP treatment group was adjusted to the control mean by subtracting the calculated day 42 and 41 body weight gains, and then iteratively subtracting the same fractions of the calculated day 40 body weight gain of all pens of the LDPP treatment until a single fractional day was found that produced a weight gain matching with the control group. From interpolated daily body weight data, daily feed consumption was first calculated as 5% of body weight. The sum of these daily feed uptakes was then divided by the actual weighed feed uptake of each pen, and daily feed uptakes were multiplied by this fraction to arrive at the precise weighed feed uptake per pen. These calculated daily feed uptakes were used to calculate feed uptake by changed times on feed for the LDPP treatment group. Mean feed uptake of the LDPP treatment group was then calculated by subtracting for each pen the previously found day 42 and 41 and the fractional day 40 feed uptake.

Body weight gain and feed consumption data were analyzed by one-way ANOVA and Student's T-test. Differences in feed conversion rates were evaluated from pen FCR data by non-parametric Mann Whitney U test.

Results and Conclusions

Figure 3:
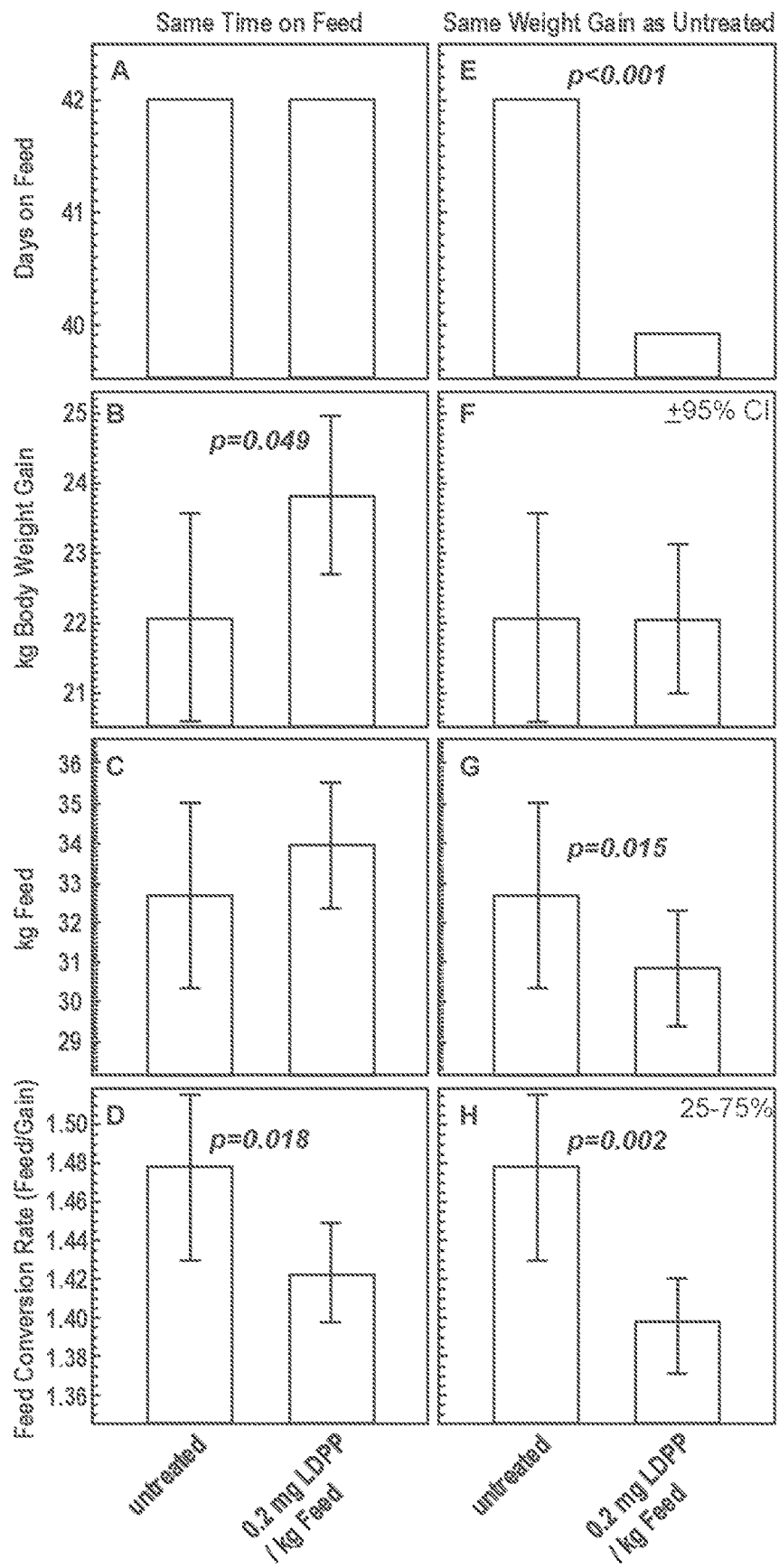
FIG. 3 contains bar graphs showing the evaluation of the growth promotion effect of L-lactate-D-alanine-L-glutamine palmityl ester (LDPP) in nursery pigs. (A) The experimental diets were fed from start on day 0 through termination on day 42 (42 days constant time). (B) Body weight gain per pig on constant time. Data shown are means±95% confidence interval (95% CI). (C) Total feed consumed per pig on constant time, means±95% CI. (D) Feed conversion rate as determined by dividing total consumed feed by total weight gains of all pigs on constant time of each group. Error bars indicate 25-75 percentiles of calculated feed conversions of individual pens. (E) Modeling of time on feed required for weight gain identical to the untreated controls (22.076 kg constant weight gain). (F) Body weight gain per pig on constant weight gain, means±95% CI. (G) Total feed consumed per pig on constant weight gain, means±95% CI. (H) Feed conversion rate for constant weight gain of each treatment group. Morbidity and mortality rates did not differ significantly between groups Significant differences between treatment groups are indicated by bold p values.

LDPP, supplemented at 0.2 mg/kg feed, significantly improves the growth rate of nursery pigs by increasing the weight gain of LDPP-treated pigs by 7.9% to 23.826 kg as compared to the 22.076 kg weight gain of untreated nursery pigs. This resulted in highly significant, 2.1 days more rapid growth of the LDPP-treated pigs as compared to the controls (39.921 vs 42 days). The feed conversion rate of LDPP-treated versus untreated pigs is improved by 3.8% at constant time from 1.479 to 1.423, and more strongly by 5.5% to 1.396 at constant body weight gain. The results are shown in FIG. 3.

All references cited herein are hereby incorporated by reference in their entireties.

REFERENCES

1. MacDonald, C., N. Inohara, G. Nuñez. 2005. Peptidoglycan signaling in innate immunity and inflammatory disease. *The Journal of Biological Chemistry* 280: 20177-20180.
2. Watanabe, T., N. Asano, P. J. Murray, K. Ozato, P. Tailor, I. J. Fuss, A. Kitani, W. Strober. 2008. *The Journal of Clinical Investigation* 118: 545-559.
3. Watanabe, T., N. Asano, G. Meng, K. Yamashita, Y. Arai, T. Sakurai, I. J. Fuss, A. Kitani, T. Shomosegawa, T. Chiba, W. Strober. 2014. *Mucosal Immunology* 7: 1312-1325.
4. Strober, W. 2013. Use of muramyl dipeptide (MDP) for treating inflammation. U.S. Pat. No. 8,603,978 B2.
5. Parant, M. A., F. M. Audibert, L. A. Chedid, M. R. Level, P. L. Lefrancier, J. P. Choay, E. Lederer. 1980. *Infection and Immunity* 27: 826-831.
6. Matsumoto, K., T. Otani, T. Une, Y. Osada, H. Ogawa, I. Azuma. 1983. Stimulation of nonspecific resistance to infection induced by muramyl dipeptide analogs substituted in the γ-carboxyl group and evaluation of $N^{\alpha}$-muramyl dipeptide-$N^{\epsilon}$-stearoyllysine. *Infection and Immunity* 39: 1029-1040.
7. Fogler. W. E., R. Wade, D. E. Brudnish, I. J. Fidler. 1985. Distribution and fate of free and liposome-encapsulated [3H]nor-muramyl dipeptide and [3H]muramyl tripeptide phosphatidylethanolamine in mice. *Journal of Immunology* 135: 1372-1377.
8. Fidler, I. J., W. E. Fogler, A. F. Brownbill, G. Schumann. 1987. Systemic activation of tumoricidal properties in mouse macrophages and inhibition of melanoma metastases by then oral administration of MTP-PE, a lipophilic muramyl dipeptide. *Journal of Immunology* 138: 4509-4514.
9. Irby, D., C. Du, F. Li. 2017. Lipid-drug conjugate for enhancing drug delivery. *Molecular Pharmaceutics* 14: 1325-1338.
10. Gobec, M., I. Mlinarič-Raščan, M. Sollner Dolenc, Ž. Jakopin. 2016. Structural requirements of acylated Gly-L-Ala-D-Glu analogs for activation of the innate immune receptor NOD2. *European Journal of Medicinal Chemistry* 116: 1-12.
11. Penney, C., Z. Boulos. 1999. Novel lipophilic oligopeptides with immunomodulating activity. European Patent EP 0 635 026 B1.
12. Nalle, H. D., B. Kaltenboeck. 2017. Methods to promote growth and improve feed conversion in animals Patent Application PCT/US2017/038790.
13. Sidwell, R. W., D. F. Smee, J. H. Huffman, K. W. Bailey, R. P. Warren, R. A. Burger, C. L. Penney. 1995. Antiviral activity of an immunomodulatory lipophilic desmuramyl dipeptide analog. *Antiviral Research* 26: 145-159.
14. Zhou, N., Z. Luo, J. Luo, X. Fan, M. Cayabyab, M. Hiraoka, D. Liu, X. Han, J. Pesavento, C.-Z. Dong, Y. Wang, J. An, H. Kaji, J. G. Sodroski, Z. Huang. 2002. Exploring the stereochemistry of CXCR4-peptide recognition and inhibiting HIV-1 entry with D-peptides derived from chemokines. *The Journal of Biological Chemistry* 277: 17476-17485.
15. Jeanloz, R. W., A. Veyrieres. 1970. Amino sugars. LV. Absolute configuration of the carboxyethyl (lactyl) side chain of muramic acid[2-amino-3-0-(D-1-carboxyethyl)-2-deoxy-D-glucose]. *Biochemistry* 9: 4153-4159.
16. van Meer, G., D. R. Voelker, G. W. Feigenson. 2008. Membrane lipids: where they are and how they behave. *Nature Reviews Molecular Cell Biology* 9: 112-124.
17. Spector, A. A., M. A. Yorek. 1985. Membrane lipid composition and cellular function. *Journal of Lipid Research* 26: 1015-1035.
18. Hatfield, J. M., R. A. Umans, J. L. Hyatt, C. E. Edwards, M. Wierdl, L. Tsurkan, M. R. Taylor, P. M. Potter. 2016. Carboxylesterases: general detoxifying enzymes. *Chemico-Biological Interactions* 259: 327-331.

While one or more example embodiments have been described with reference to the figures, it will be understood by those of ordinary skill in the art that various changes in form and details may be made therein without departing from the spirit and scope of the inventive concept as defined by the following claims.

What is claimed is:

1. An oligopeptide of the following formula:

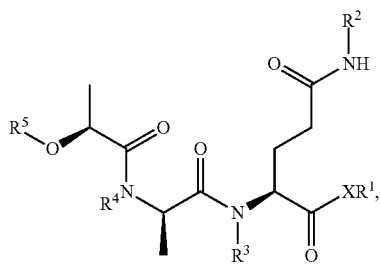

or a pharmaceutically acceptable acid or salt thereof, wherein:
- $R^1$ is $C_1$-$C_{18}$ linear alkyl or substituted or unsubstituted aryl;
- $R^2$, $R^3$, and $R^4$ are each independently selected from H, substituted or unsubstituted alkyl and substituted or unsubstituted aryl;
- $R^5$ is H, unsubstituted alkyl, or substituted or unsubstituted aryl; and
- X is O or $NR^6$, wherein $R^6$ is hydrogen, substituted or unsubstituted alkyl, or substituted or unsubstituted aryl.

2. The oligopeptide of claim 1, wherein X is O.

3. The oligopeptide of claim 1, wherein the oligopeptide has the following structure:

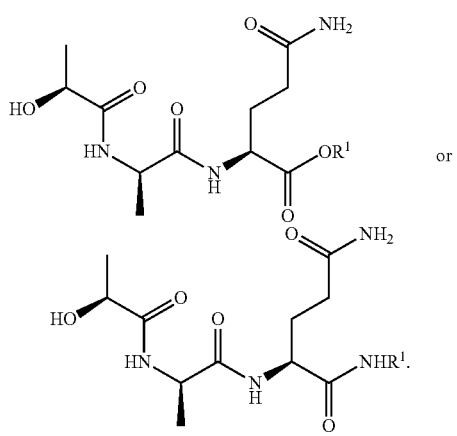

4. The oligopeptide of claim 1, wherein the oligopeptide has the following structure:

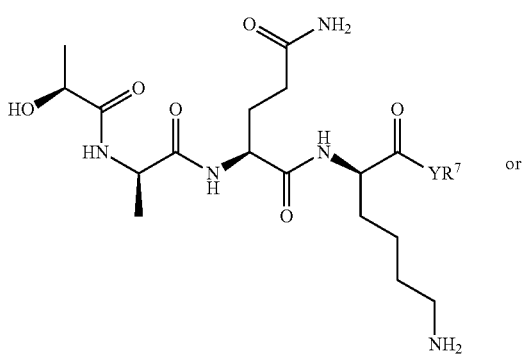

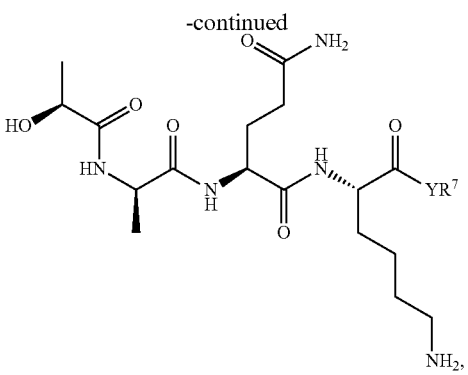

wherein
- $R^7$ is substituted or unsubstituted alkyl or substituted or unsubstituted aryl; and
- Y is O or $NR^8$, wherein $R^8$ is hydrogen, substituted or unsubstituted alkyl, or substituted or unsubstituted aryl.

5. The oligopeptide of claim 1, wherein the oligopeptide is L-lactate-D-alanine-L-glutamine-hexadecyl ester.

6. A pharmaceutical composition comprising at least one oligopeptide of claim 1 and a pharmaceutically acceptable carrier.

7. A composition comprising at least one oligopeptide of claim 1 and animal feed.

8. The composition of claim 7, wherein the at least one oligopeptide is present in the composition in an amount of from about 0.01 mg/kg to 5 mg/kg.

9. The composition of claim 7, wherein the composition further comprises an additive used in an animal diet.

10. The composition of claim 9, wherein the additive comprises an enzyme, a probiotic, a prebiotic, an antioxidant, an antibiotic growth promoter, a coloring agent, or a combination thereof.

11. A method for reducing intestinal inflammation in a human, comprising:
administering the pharmaceutical composition of claim 6 to a human having intestinal inflammation, wherein the administration reduces the intestinal inflammation.

12. A method for promoting growth in an animal, comprising:
administering the oligopeptide of claim 1 to an animal, wherein the administration enhances the growth of the animal.

13. A method for promoting growth in an animal, comprising:
administering the composition of claim 7 to an animal, wherein the administration enhances the growth of the animal.

14. A method for enhancing feed conversion in an animal, comprising:
administering the oligopeptide of claim 1 to an animal, wherein the administration enhances the feed conversion of the animal.

15. A method for enhancing feed conversion in an animal, comprising:
administering the composition of claim 7 to an animal, wherein the administration enhances the feed conversion in the animal.

16. The oligopeptide of claim 1, wherein $R^5$ is H.

17. The method of claim 11, further comprising selecting a human having a disease or condition associated with intestinal inflammation.

18. The method of claim 17, wherein the disease or condition associated with intestinal inflammation comprises inflammatory bowel disease, irritable bowel syndrome, Crohn's disease, ulcerative colitis, or a bacterial infection.

* * * * *